(No Model.)
G. FISHER.
COFFEE ROASTER.
No. 262,390. Patented Aug. 8, 1882.
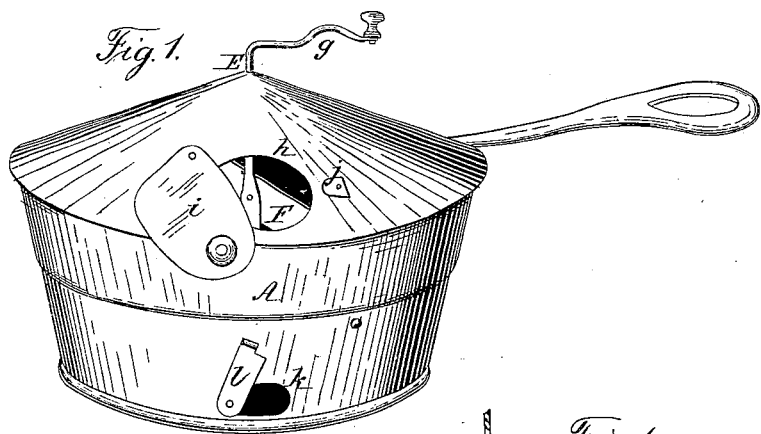
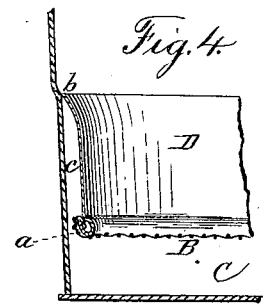
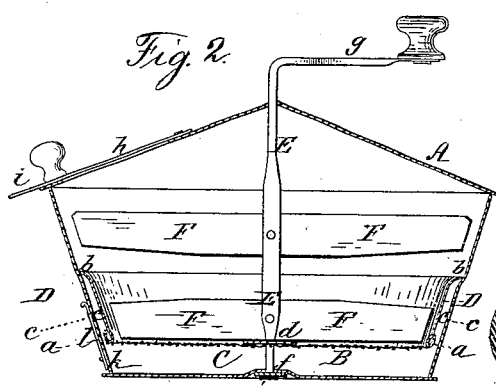
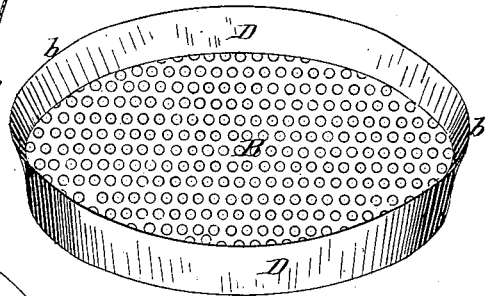
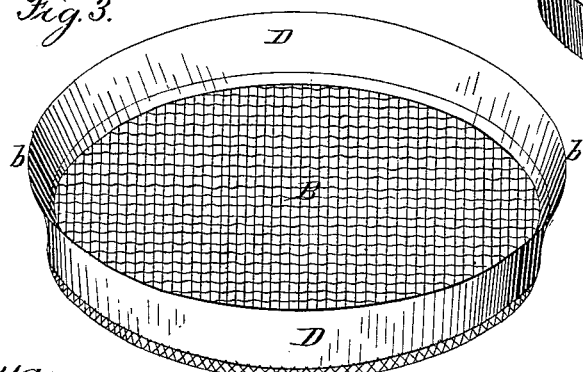
Witnesses:
Edmond Broshag
Philip F. Larner
Inventors:
pro Geo Fisher
Johnson & Johnson
Attys

UNITED STATES PATENT OFFICE.

GEORGE FISHER, OF TOLEDO, OHIO.

COFFEE-ROASTER.

SPECIFICATION forming part of Letters Patent No. 262,390, dated August 8, 1882.

Application filed June 27, 1882. (No model.)

*To all whom it may concern:*

Be it known that I, GEORGE FISHER, a citizen of the United States, residing at Toledo, in the county of Lucas and State of Ohio, have invented new and useful Improvements in Coffee-Roasters, of which the following is a specification.

I have improved the style of coffee-roaster which was patented to me March 6, 1877, under No. 188,119, and in which a closed pan-like chamber has double walls and an interior perforated bottom, forming a heat and dust chamber opening into the circumferential chamber formed by the double walls and a winged stirrer arranged to be revolved within the chamber in close proximity to the perforated bottom.

My present improvements are designed to cheapen the production of the roasting-pan, and to render the roasting of the coffee more effective and uniform, as will be hereinafter explained, and the matters of improvement made the subject of specific claims.

Referring to the accompanying drawings, Figure 1 represents a view in perspective of my improved coffee-roasting pan; Fig. 2, a vertical section of the same. Fig. 3 shows the separate ring-band and its wire bottom; Fig. 4, an enlarged section of the same, showing more particularly the manner of beading the edges of the wire bottom to the lower edges of the ring-band; and Fig. 5 shows the perforated bottom and ring-band in one piece stamped into form.

A closed pan, A, forms the roasting-chamber, with a flat bottom. A wire bottom, B, forms the bottom proper of the roasting-chamber and a heat and dust collecting chamber, C, at the bottom of the pan. This wire bottom is secured to a separate ring-band, D, by having its edge folded and bound in a bead, *a*, formed around the lower edge of said band, the edge of said wire bottom being turned in the bead on the outer side of said band, while the edge bead itself projects within the ring, so as to leave the turned-in wire edge about flush with the outer side of the band, as shown in Fig. 4. The upper edge of this ring-band is turned out, so as to form a rim, *b*, and thus made it serves to secure the wire bottom to the inner wall of the pan and to form a wall-chamber, *c*, opening into the bottom chamber. The ring-band is thus secured by being riveted near its rimmed edge *b* to the sides of the pan, and forms a convenient and cheap way of attaching the bottom and of providing a double wall around the lower portion of the pan, so as to form an annular space to co-operate with the bottom chamber, C, from which the heat rises through the perforated bottom into the roasting-chamber and to prevent contact of the coffee with that portion of the walls of the pan which would be liable to burn the grains. The ring-band joins the wall of the pan by its rim *b*, and forms the wall-space by being of a less diameter than the pan. A stem, E, centrally arranged in the pan, is provided with two or more stirrers, F, formed of flat plates, the lower one of which is arranged in close proximity to the perforated bottom, so that in revolving the stem the plates stir the coffee and distribute it evenly to the action of the heat, giving it a uniform roasting. I prefer to have the plates broad and the space between them increasing in width to their ends, so as to cause the coffee to pass freely between the plates as they are revolved. The stem is secured to the bottom of the pan by an inner and an outer washer, *d e*, to the outer one, *e*, of which it is riveted, and to allow the pan to set flat upon the stove the bottom is formed with a cavity, *f*, to receive the outer washer, so that the stem has a fixed relation to the bottom and its stirring-plates a fixed relation to the perforated bottom. The stirrer is operated by the crank-handle *g*, and the pan is provided with a handle.

The coffee is put in and poured out of the pan through the opening *h* in the top, provided with a knobbed pivoted cover, *i*, adapted to be sprung under and held by a button, *j*, riveted to the top. An opening, *k*, in the wall of the pan is covered by a pivoted slide, *l*, and serves to clean the bottom chamber of dust.

Instead of making the ring-band and its perforated bottom of two parts, as described, it may be made of a single piece of sheet metal pressed into the form of a basin, its bottom perforated and its upper edge rimmed, so as to allow the heat to pass into the roasting-chamber and form the wall-space.

The aroma of the coffee during the roasting is confined within the pan. In my said patent the pan is made in two connected parts, to the upper one of which the wire bottom is secured, and the lower one forms the double-wall space and the bottom chamber, while in the pan as I have improved it the separate ring-band and perforated bottom give the advantage of greater cheapness and convenience in the manufacture of the pan, and form an interior attachable device to the body of the pan.

I claim—

1. The combination, substantially as described, in a coffee-roaster, of the closed pan and a revolving stirrer, with ring-band perforated-bottom device secured to the interior wall of the pan, whereby to form the double-wall space and the bottom chamber, for the purpose specified.

2. The attachable ring-band perforated-bottom device formed with outward-turned top circumferential rim $b$, in combination with the closed pan and the revolving stirrer, substantially as set forth.

3. In combination, in a coffee-roaster, the closed pan, the perforated bottom, the rimmed ring-band, and the revolving stirrer having the plates, and secured by its cranked stem to the bottom by the inner and outer washers, $d\ e$, the latter seated in a cavity, $f$, formed in the bottom, as set forth, for the purpose specified.

4. The coffee-roaster herein described, consisting of the closed pan, the perforated bottom, the rimmed ring-band, the revolving stirrer, the top pivoted cover, $i$, the fixed button $j$, and the side covered opening, $k$, all constructed and adapted for use as set forth.

In testimony whereof I have hereunto set my hand in the presence of two subscribing witnesses.

GEO. FISHER.

Witnesses:
 IRA E. LEE,
 CHAS. A. LEE.